(12) United States Patent
Chalich

(10) Patent No.: US 6,230,446 B1
(45) Date of Patent: May 15, 2001

(54) FRANGIBLE WEDGE SHIM FOR CONSTRUCTION

(76) Inventor: Dan Chalich, 14378 86th Ave. N., Seminole, FL (US) 33776

( * ) Notice: Subject to any disclaimer, the term of this patent is extended or adjusted under 35 U.S.C. 154(b) by 0 days.

(21) Appl. No.: 09/565,030

(22) Filed: May 5, 2000

(51) Int. Cl.$^7$ ...................................................... E04C 2/10
(52) U.S. Cl. ........................ 52/98; 52/126.1; 248/188.2; 16/17.1; 428/43
(58) Field of Search ............................. 52/98–160, 126.1, 52/749; 428/43, 33; 206/499; 248/188.2; 16/4–7, 10, 16, 17.1

(56) References Cited

U.S. PATENT DOCUMENTS

| | | | |
|---|---|---|---|
| 4,232,068 | * 11/1980 | Hoh et al. | ................................ 428/43 |
| 4,336,879 | * 6/1982 | Carr | ....................................... 52/98 X |
| 4,625,489 | 12/1986 | Bögle . | |
| 4,662,553 | * 5/1987 | Grossean | ................................ 52/100 |
| 4,908,245 | * 3/1990 | Shah et al. | .............................. 428/33 |
| 5,054,250 | 10/1991 | Foss . | |
| 5,163,255 | * 11/1992 | Gamba | ..................................... 52/98 |
| 5,611,514 | 3/1997 | Oliver et al. . | |
| 5,624,724 | * 4/1997 | Relly | ....................................... 428/43 |
| 5,815,992 | 10/1998 | Wells et al. . | |
| 5,853,838 | 12/1998 | Siems et al. . | |
| 5,953,862 | 9/1999 | Earhart et al. . | |
| 6,062,517 | * 5/2000 | Torres et al. | ....................... 248/188.2 |

\* cited by examiner

*Primary Examiner*—Richard Chilcot
(74) *Attorney, Agent, or Firm*—Siemens Patent Services, L.C.

(57) ABSTRACT

A plastic wedge shaped shim for leveling which is prescored to enable protruding section to be broken off. Parallel, straight, scores are formed at regular intervals on the top surface of the shim. These scores form teeth enabling stacked shims to interengage one another when one is placed inverted on another. The underside of the shim has recesses configured such that there exists a zone of constituent material which has equal localized thickness measurements along that portion of the length of the shim wherein scores and the recess formed in the underside of the shim are in overlying relationship. In an alternative embodiment of the invention, the recesses form cleats for resisting sliding or other displacement of the shim.

10 Claims, 2 Drawing Sheets

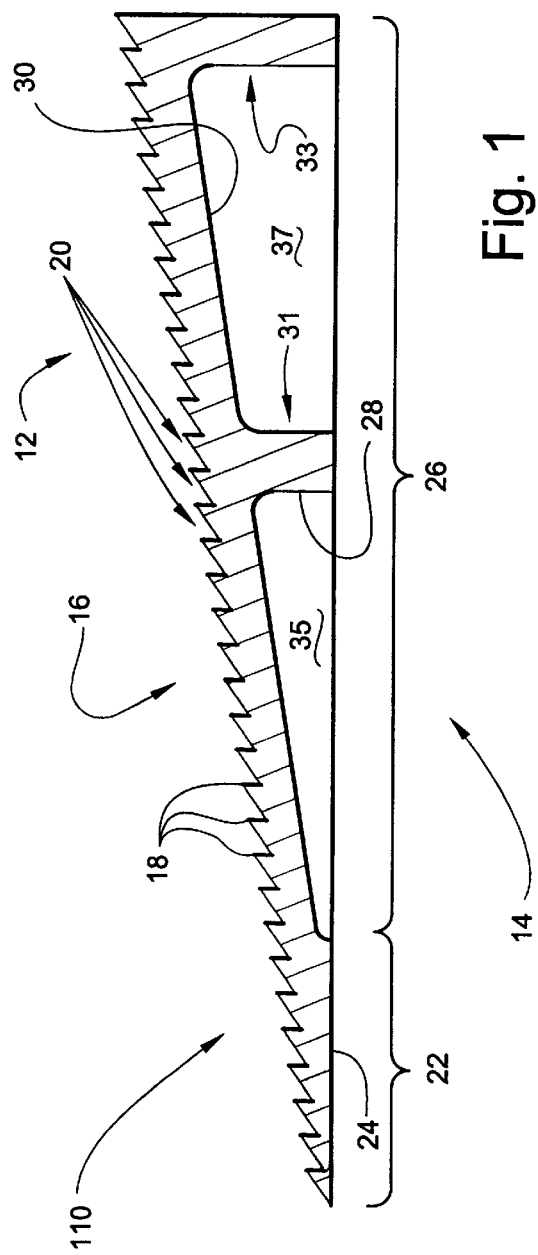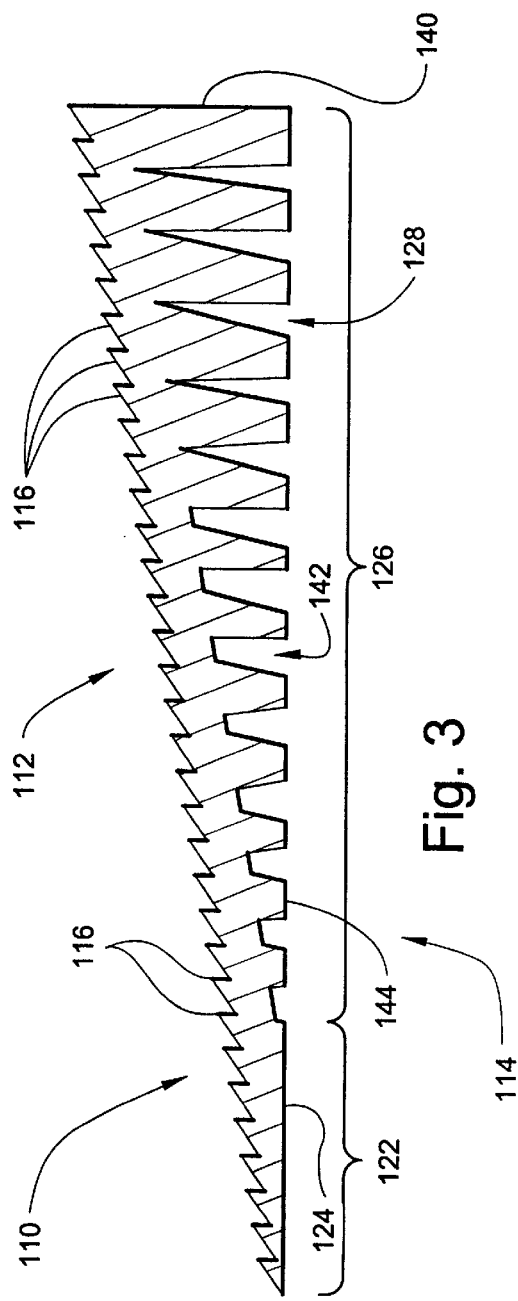

FRANGIBLE WEDGE SHIM FOR CONSTRUCTION

BACKGROUND OF THE INVENTION

1. Field of the Invention

The present invention relates to shims utilized for adjusting spacing of construction elements. More specifically, the invention sets forth wedge shaped shims which are driven between two adjacent construction elements. A principal application of the invention is in the field of construction, both new and remedial or rehabilitative. However, the invention could also be utilized in industrial, institutional, and other settings wherein large or heavy objects must be adjusted as to position on the ground or other supporting surface.

2. Description of the Prior Art

When buildings are constructed, construction elements such as beams, casings, joists, and other structural members may be installed out of alignment with horizontal or other desired orientations. This may occur as a result of warped configuration of one or more structural members, of inappropriate dimensions, shifting of foundations, and other causes. It is frequently neither economical nor feasible to demolish and rebuild the objectionable construction. Placement of shims to take up gaps and otherwise adjust structural elements has answered the need in many cases.

Load bearing functions of shims must be balanced with esthetic and other considerations. A shim driven between two structural members may protrude objectionably from the building. The protruding portion is usually cut or broken off so that the finished surface may be made flush. It is desirable to score a shim so that sections may be broken off at predetermined points or intervals, and so that the break occurs along a straight line.

The prior art has proposed toothed wedges or shims for construction. U.S. Pat. No. 5,611,514, issued to James Oliver et al. on Mar. 18, 1997, shows an adjustable pipe pier having toothed wedges. Unlike the wedges of Oliver et al., the novel shims have a first solid section and a second relieved or partially hollow section. The novel shims thereby provide an extremely thin or sharp pointed end having a significant degree of strength. The pointed end of the wedge of Oliver et al. either cannot be formed to be as thin or sharp as that of the present invention, or alternatively, if formed as thin as the novel shim, would be weaker than the pointed edge of the novel shim.

U.S. Pat. No. 4,625,489, issued to Ulrich Bögle on Dec. 2, 1986, shows a wedge having cleats formed therein. Unlike the present invention, the wedge of Bögle is formed from sheet metal, and is not frangible as is the present invention.

U.S. Pat. No. 5,054,250, issued to Robert E. Foss on Oct. 8, 1991, sets forth flexible shim. Being flexible, the shim of Foss is not frangible, as is the present invention.

U.S. Pat. No. 5,815,992, issued to Raymond Wells et al. on Oct. 6, 1998, shows a stepped shim which lacks the two sections of the novel shim, wherein one surface of the shim has scores for breaking.

U.S. Pat. No. 5,853,838, issued to Stanley J. Siems et al. on Dec. 29, 1998, shows a wedge shaped shim wherein one side is flat and devoid of recesses or teeth found in the present invention. There is no zone of relatively constant minimum thickness, as seen in the present invention.

U.S. Pat. No. 5,953,862, issued to Levitt D. Earhart et al. on Sep. 21, 1999, describes a shim having grooves or other recesses located on each of the two broad faces of the shim. However, unlike the present invention, there is no zone of constant minimum thickness formed between the upper and lower grooves or recesses, as seen in the present invention.

None of the above inventions and patents, taken either singly or in combination, is seen to describe the instant invention as claimed.

SUMMARY OF THE INVENTION

The present invention provides a frangible, wedge shaped shim having scores formed along the entire length of the first one of the two broad faces of the shim, and recesses formed along part of the length of the second broad face. The shim is demarcated into two sections by the second broad face. One section is characterized by grooves or recesses formed in the second broad face. In this section, scores of the first face overlie grooves or recesses formed in the second broad face. The second section is characterized by a flat, unrelieved surface of the second broad face. In the second section, scores of the first face overlie the flat surface of the second broad face.

The scores enable sections of the shim to be broken off by impact. Illustratively, when the shim is driven between two solid objects such as adjacent pieces of lumber and the wider end of the shim protrudes from between these pieces of lumber, the exposed end may be broken off by striking it with a tool such as a hammer. The scores are straight and parallel, so that an even break results.

The thin, pointed end of the wedge shaped shim has reasonable strength for resisting unintended breaking when being driven between two pieces of lumber. The thicker end is weakened by the grooves or recesses formed in the second broad face. This feature limits strength of the shim, thereby enabling the thicker end to be broken off by hammer blows.

The shim has a zone of constituent material of relatively constant minimum thickness along the second section. This characteristic imparts relatively constant strength of the upper surface of the shim, thereby promoting breakage at a desired point along the length of the shim when struck by a hammer. The desired point is in most cases that point wherein the shim protrudes from a supporting surface. Alternatively stated, that portion which overhangs a board or other surface which provides support to part of the shim is readily broken away by a hammer blow. If the upper surface of the shim were of variable thickness, as is typical of a solid wedge shaped shim, the point of breakage would not necessarily coincide with the scores formed on the first broad face of the shim.

Preferably, the scores form pointed teeth configured to interengage similar teeth of a second shim placed in inverted relation on a first shim. This characteristic enables the novel shim to be utilized in pairs to form a support having parallel upper and lower surfaces. Overall height of the pair of shims is adjustable within limits imposed by dimensions of the teeth.

In an alternative embodiment of the invention, the recesses formed on the second section of the shim form cleats which prevent the shim from slipping or otherwise being displaced when driven between two structural members such as pieces of lumber. Teeth formed by the break scores provide corresponding cleats on the other side of the shim, so that both sides are provided with structure for engaging the surfaces of surrounding solid objects.

The novel shim is formed from any suitable strong, rigid material which enables the shim to be driven between two objects and broken off by striking. A preferred constituent material is recycled plastic. This material finds use for a material which is potentially a waste product if not recycled. Also, plastic is impervious to water, insects, mildew, and other deleterious natural influences which plague traditional wooden shims.

Accordingly, it is a principal object of the invention to provide a frangible wedge which can be broken off flush after being driven between two solid objects.

It is another object of the invention that the shim break along a straight line when struck.

It is a further object of the invention to assure that the sharp, pointed end of the shim have adequate strength to resist unintended breakage when being driven between two solid objects.

Still another object of the invention is to provide break scores at constant spacing intervals.

An additional object of the invention is to provide cleats on one side of the shim which, together with the scores, enable the shim to engage surfaces of two surrounding solid objects.

Yet another object of the invention is that the novel shim be impervious to water and deterioration by insects, mildew, and other natural influences.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several view, and wherein:

FIG. 1 is a side cross sectional view of one embodiment of the invention.

FIG. 3 is a side cross sectional view of a second embodiment of the invention.

DETAILED DESCRIPTION OF THE PREFERRED EMBODIMENTS

Figure 2:
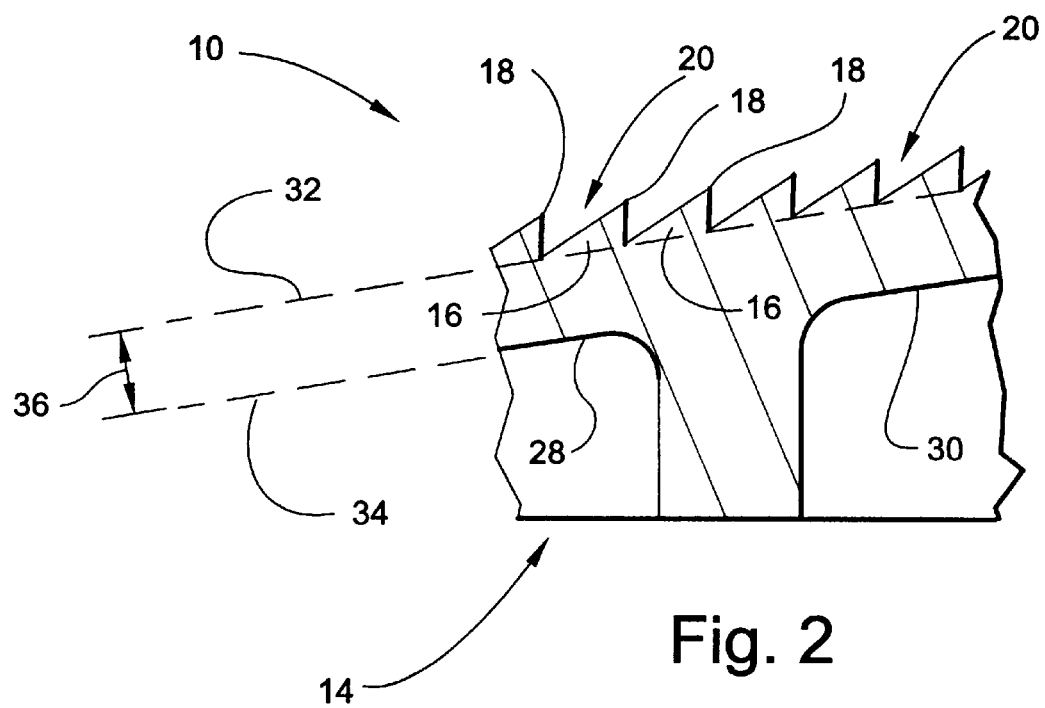
FIG. 2 is an enlarged detail view of FIG. 1.
Figure 4:
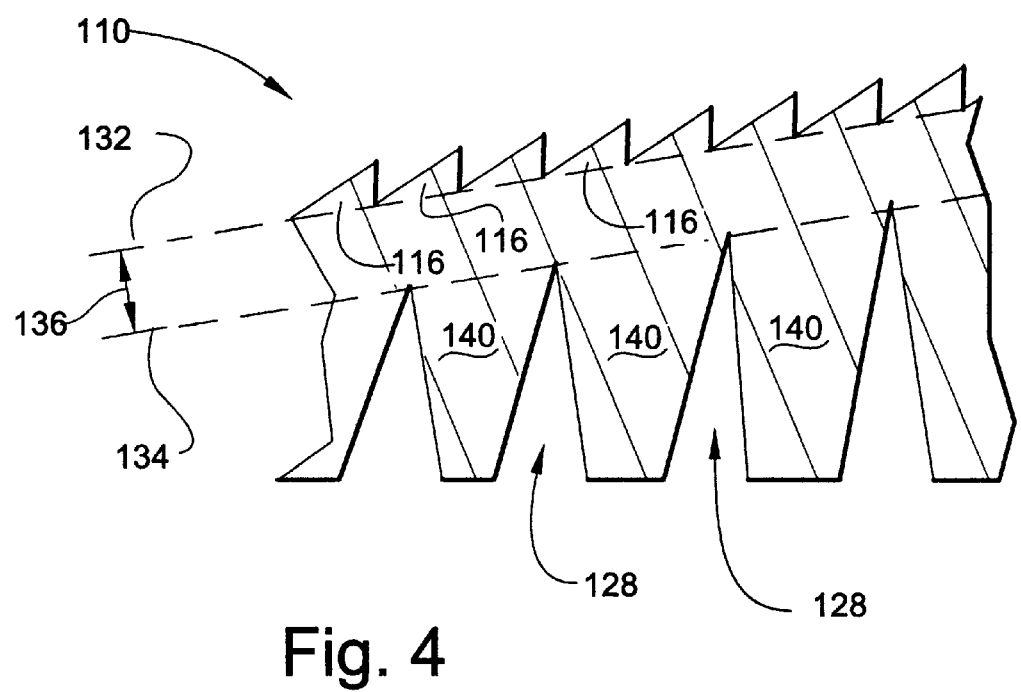
FIG. 4 is an enlarged detail view of FIG. 2.

FIG. 1 of the drawings shows one embodiment of frangible, wedge shaped shim 10. Shim 10 has a first major exposed surface or broad face 12 and a second major exposed surface or broad face 14 disposed at an acute angle to first broad face 12. Face 12 and face 14 are located on opposite sides of shim 10. Face 12 bears scores formed therein for breaking shim 10 selectively at any one of plural points along the length of shim 10. Preferably, the scores are in the form of teeth 16 having pointed crests 18 facing away from shim 10 and corresponding troughs 20 formed between adjacent teeth 16. It will be seen that teeth 16 and associated crests 18 and troughs 20 are spaced apart at constant or regular intervals. Teeth 16 are straight and parallel to one another.

Preferably, teeth 16 are dimensioned and configured such that teeth 16 interengage corresponding teeth (not shown) of a similar second shim (not shown) when the teeth of the second shim are placed against teeth 16 of shim 10 when the second shim is inverted relative to shim 10. To this end, it will be seen that one surface of each tooth 16 is vertical when surface 24 is horizontally oriented, and the other surface of each tooth 16 is arranged at an obtuse angle to the first surface. Notably, this configuration prevents the upper shim from sliding on shim 10 when placed thereon and the respective teeth interengage. An adjustable shim having parallel opposing major surfaces may, therefore be built up from two shims similar to shim 10. Spacing of the major surfaces is adjustable, being dependent upon the degree two which the two shims overlie one another. Adjustment of spacing is limited by dimensions of the interengaged teeth.

Shim 10 may be said to comprise two sections. The first section 22 is solid in that there is continuous, uninterrupted constituent material from the upper surface or face 16 to lower surface 24. By contrast, relieved second section 26 comprises that portion of shim 10 wherein scores 16 overlie that portion of lower surface 24 interrupted by reliefs such as recesses 28, 30. Recesses 28, 30 are bounded by walls 31, 33 which oppose collapse of shim 10 when loads are imposed thereon. End walls 35, 37 brace walls 31, 33 against collapse.

Turning now to FIG. 2, it will be seen that a zone of solid, continuous constituent material exists between first exposed surface 12 and second exposed surface 14 at second relieved section 26. This zone is indicated by projection lines 32, 34. Thickness of this zone, indicated by arrow 36, has equal localized minimum thickness values where the zone extends along section 26 cue to configuration and dimensions of teeth 16 and surface 14. Minimum thickness values occur between the lowermost point of each trough 20 and the nearest point of surface 14.

FIG. 3 shows an alternative embodiment of the invention wherein one broad face or surface 112 of shim 110 corresponds in configuration to surface 12 of FIG. 1. The other broad face or surface 114 is formed in two sections 122, 126. Section 122 of FIG. 2 is similar to section 22 of FIG. 1. However, Section 126 of the embodiment of FIG. 2 differs from section 26 of the embodiment of FIG. 1 in that recesses 128 are configured to establish a series of feet or cleats 140 along section 126. Cleats 140 form troughs (one trough is designated representatively as 142) between adjacent cleats 140. Cleats 140 and troughs 142 are preferably spaced apart at regular or constant intervals. Cleats 140 have flat distal surfaces 144, rather than pointed crests 118 of surface 112, so that each cleat can bear a relatively great load.

The embodiment of FIG. 3 is useful when shim 110 is driven between two objects having resilient surfaces. An example of such objects and surfaces is that of soft pine, which is frequently employed in framing of buildings.

The embodiment of FIG. 3 shares two important characteristics with the embodiment of FIG. 1. One is that shim 110 includes two sections 122, 126 corresponding to sections 22, 26 of the embodiment of FIG. 1. The other is that shim 110 has a zone of solid, continuous constituent material existing between first exposed surface 112 and second exposed surface 114 at second relieved section 126. This zone, which corresponds to a similar zone in the embodiment of FIG. 1, is indicated by projection lines 132, 134. Thickness of this zone, indicated by arrow 136, has equal localized minimum thickness values where the zone extends along section 126 due to configuration and dimensions of teeth 116 and surface 114, in a manner similar to that of FIG. 1.

Preferably, any embodiment of the novel shim is formed from a light weight, inexpensive, rigid, frangible material such as recycled plastic. For the purposes of the present invention, rigidity signifies that the shim will not deform objectionably when driven between two solid objects, and will break evenly along a score when struck by a hammer.

It is to be understood that the present invention is not limited to the embodiments described above, but encompasses any and all embodiments within the scope of the following claims.

I claim:

1. A frangible, wedge shaped shim having a first broad face and a second broad face disposed at an acute angle to said first broad face, wherein said shim is formed from a rigid, frangible constituent material to include a solid first section and a relieved second section abutting said solid first section, wherein said relieved second section comprises that portion of the length of said shim wherein said scores formed in said first broad face overlie said recesses formed in said second broad face, said first broad face has a first exposed surface exposed to the exterior of said shim and bears a plurality of scores formed therein for breaking said shim selectively at any one of plural points, and said second broad face has at least one recess formed therein at said relieved section, said recess having a second exposed surface exposed to the exterior of said shim on an opposite side of said first exposed surface, wherein a zone of solid, continuous said constituent material exists between said first exposed surface and said second exposed surface at said second relieved section, and said scores formed in said first broad face and said second exposed surface of said second broad face are dimensioned and configured such that said zone of solid constituent material has equal localized minimum thickness values disposed along said second relieved section.

2. The shim according to claim 1, wherein said scores formed in said first broad face form a series of teeth each having a crest facing away from said shim.

3. The shim according to claim 2, wherein said crests of said teeth are spaced apart from one another at constant intervals.

4. The shim according to claim 1, wherein said scores formed in said first broad face are straight and parallel to one another.

5. The shim according to claim 1, wherein said scores formed in said first broad face form a series of teeth wherein each pair of adjacent said teeth forms a troughs separating said pair of adjacent teeth, and wherein said troughs are spaced apart from one another at constant intervals.

6. The shim according to claim 1, wherein said recess formed in said second broad face comprises a series of teeth spaced apart from one another, wherein a trough is formed between each two adjacent said teeth.

7. The shim according to claim 1, wherein said constituent material is recycled plastic.

8. The shim according to claim 2, wherein said teeth are dimensioned and configured such that said teeth interengage corresponding teeth of a similar second shim when the teeth of the second shim is placed against said teeth of said shim, when the second shim is inverted relative to said shim.

9. A frangible, wedge shaped shim having a first broad face and a second broad face disposed at an acute angle to said first broad face, wherein said shim is formed from a rigid, frangible recycled plastic constituent material to include a solid first section and a relieved second section abutting said solid first section, wherein said relieved second section comprises that portion of the length of said shim wherein said scores formed in said first broad face overlie said recesses formed in said second broad face, said first broad face has a first exposed surface exposed to the exterior of said shim and bears a plurality of scores formed therein for breaking said shim selectively at any one of plural points, wherein said scores formed in said first broad face form a series of teeth each having a crest facing away from said shim, wherein said teeth are spaced apart from each other at regular intervals, wherein said teeth are dimensioned and configured such that said teeth interengage corresponding teeth of a similar second shim when the teeth of the second shim is placed against said teeth of said shim, when the second shim is inverted relative to said shim, and said second broad face has at least one recess formed therein at said relieved section, said recess having a second exposed surface exposed to the exterior of said shim on an opposite side of said first exposed surface, wherein a zone of solid, continuous said constituent material exists between said first exposed surface and said second exposed surface at said second relieved section, and said scores formed in said first broad face and said second exposed surface of said second broad face are dimensioned and configured such that said zone of solid constituent material has equal localized minimum thickness values disposed along said second relieved section.

10. The shim according to claim 9, wherein said recess formed in said second broad face comprises a series of teeth spaced apart from one another, wherein a trough is formed between each two adjacent said teeth.

* * * * *